Dec. 17, 1963     D. E. DAVIDSON     3,114,842
OPTICAL INSTRUMENT FOR DETERMINING ROTATION OF A REMOTE OBJECT
Filed Nov. 15, 1961     2 Sheets-Sheet 1
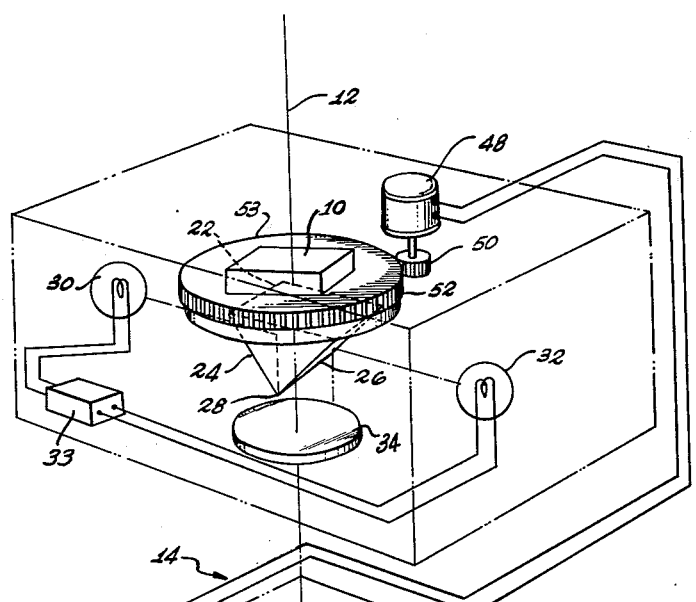
Fig. 1
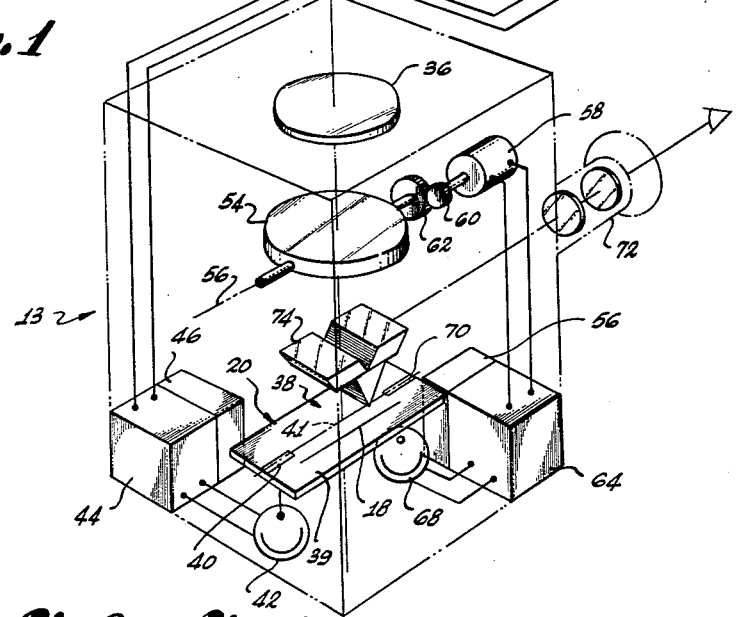
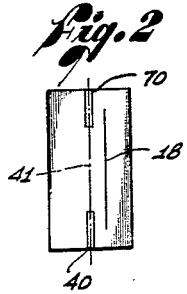
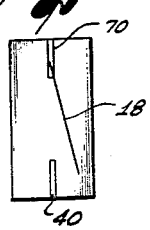
Fig. 2    Fig. 3    Fig. 4
INVENTOR.
DONALD E. DAVIDSON
BY Lilly & Nyhagen
ATTORNEYS

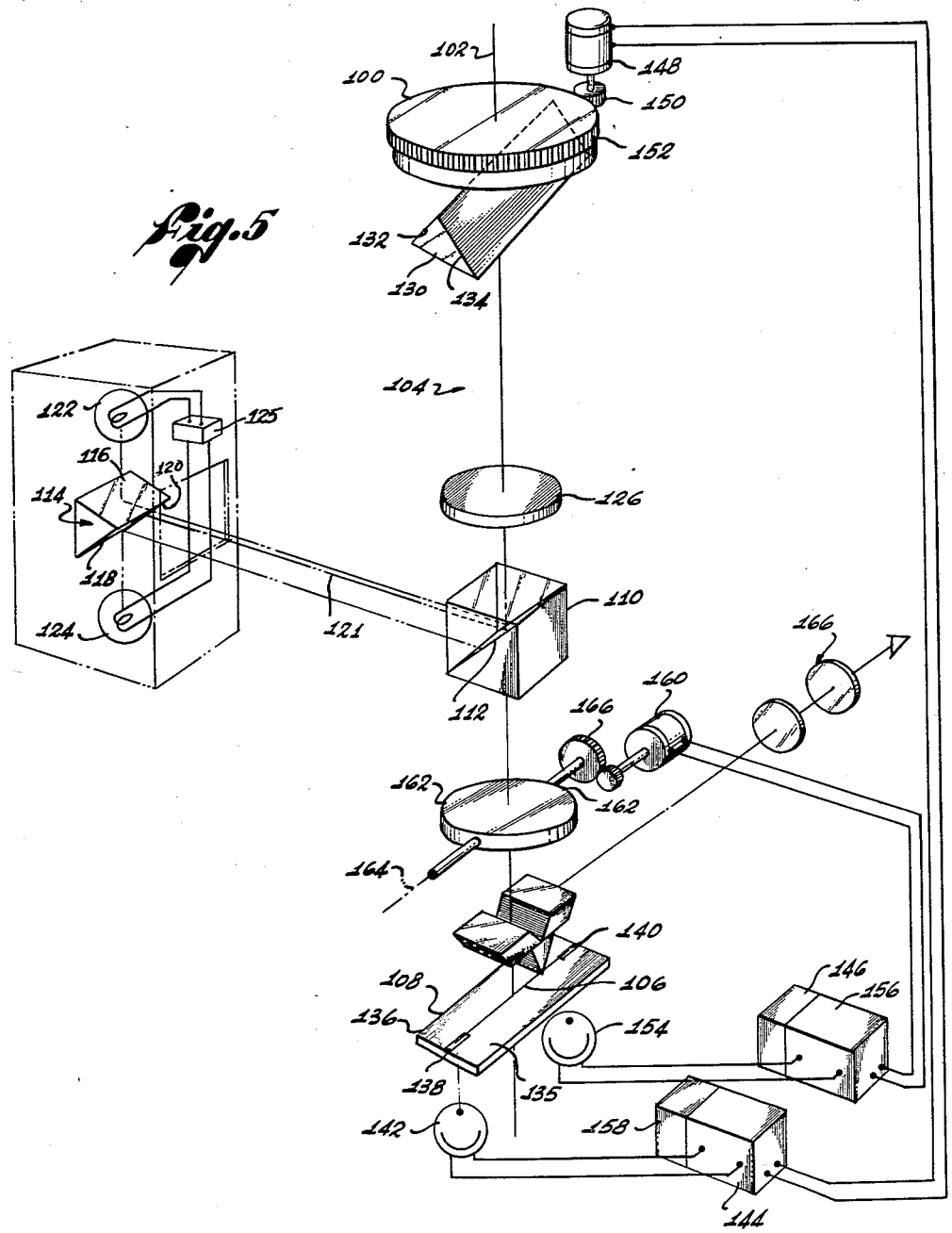

3,114,842
OPTICAL INSTRUMENT FOR DETERMINING
ROTATION OF A REMOTE OBJECT
Donald E. Davidson, La Habra, Calif., assignor to Davidson Optronics, Inc., Covina, Calif., a corporation of California
Filed Nov. 15, 1961, Ser. No. 152,499
13 Claims. (Cl. 250—234)

This invention relates generally to optical instruments and, particularly, to an optical instrument for determining slight twist or rotation of an object from a remote position along the axis of twist or rotation.

It has long been a problem to determine, with any degree of accuracy, slight twist or rotation of an object from a remote position along the axis about which the object turns. For example, slight rotation of a mirror surface, viewed at a distance through a telescope, about an axis parallel to the optic axis of the telescope is difficult to detect, and more difficult, if not impossible, to accurately measure with existing instruments for this purpose. Two problems related to this basic problem are accurately maintaining an object in a predetermined angular position on an axis of rotation from a remote position along the axis and accurately maintaining a predetermined relative angular relationship between two remote objects on a common rotation axis.

A general object of this invention is to provide an optical instrument for accurately determining slight twist or rotation of an object from a remote position along the twist or rotation axis as well as accurately maintaining the object in a predetermined angular position on the axis and accurately maintaining a predetermined relative angular relationship between the object and a second object on the axis.

Another object of the invention is to provide an optical instrument of the character described which is automatic in operation.

Other objects, advantages, and features of the invention will become evident as the description proceeds.

Briefly, the objects of the invention are attained by providing an optical instrument equipped with an optical projection means for projecting an optical index image along the twist or rotation axis of the object whose twist or rotation on the axis is to be determined and bringing the image to sharp focus on an image-receiving surface located in an image plane transverse to the axis at a remote observation station along the axis. Included in this projection means is an image-positioning member located along the axis and adapted for connection to the object to be aligned so that the angular position of the image-positioning member on the axis is constantly related to the angular position of the object on the axis. The angular position of the image-positioning member on the axis, in turn, determines the angular position of the index image on the image surface.

On the image surface is an index means with which the index image is aligned when the image surface and image-positioning member occupy a predetermined relative angular position on the rotation axis. Thus, the object and image surface can be maintained in a predetermined relative angular position by effecting relative rotation of the image-positioning member and image surface in such a way as to maintain the index image in alignment with the image surface index means. If the image surface is retained stationary and the image-positioning member is driven in rotation by a reversible motor, as in the illustrative embodiments of the invention, the remote object to be aligned can be maintained in a predetermined angular position from the observation station by appropriately controlling the motor from the station to maintain the index image and index means aligned.

A primary feature of this invention resides in an automatic control system which is embodied in the instrument for automatically maintaining the remote object in its predetermined angular position. According to this feature of the invention, the optical projection means transmits phase-fluctuating light from the image-positioning member to the image surface in such a way that fluctuating light of one phase arrives at the surface at one side of the index image and fluctuating light of another phase arrives at the surface at the other side of the image so that the latter defines a fine line of demarcation at the surface between the light of the one phase and the light of the other phase. At the observation station is a photoelectric receiver having a narrow photosensitive zone on the image surface which defines the index means referred to above and on which the index image is centered when the remote object to be aligned is in its predetermined angular position. In the centered position of the image, the photosensitive zone receives equal amounts of light of the two phases. If the object rotates slightly in one direction or the other from this position, the zone receives more light of one phase than the other.

The output of the photoelectric receiver is coupled to a phase-responsive amplifier which, in turn, controls the motor that drives the remote image-positioning member and the object to be aligned. This control system responds to the incidence of a preponderance of light of the one phase or the other phase on the photosensitive zone due to misalignment of the image and zone by energizing the motor to drive the image-positioning member and the object to be aligned in the opposite direction to return the index image toward its centered position on the zone and thereby return the object toward its aligned position.

In the illustrative embodiments of the invention, the photosensitive zone comprises a transparent exit slit in the otherwise opaque image surface. Behind this slit is a photocell to receive light passing through the slit. When the index image is exactly centered on the slit, the image falls along the longitudinal axis of the slit, as it must to permit such centering of the image. Now it is evident that when the instrument is set up, the exit slit may not, and generally will not, be so accurately aligned with the rotation axis of the index image that the image will fall exactly along the exit slit axis when rotated into parallelism with the latter axis. In other words, the image will assume a position parallel to but laterally offset from the exit slit axis.

A second important feature of this invention resides in the provision of an optical tipping plate along the rotation axis of the instrument for deflecting the index image in a transverse direction of the exit slit axis. Thus, the slit image may be exactly centered on the exit slit, so as to achieve precise alignment of the object to be aligned, by combined positioning of the image-positioning member of the projection means and the optical tipping plate. Automatic positioning of the tipping plate is effected by a second phase-responsive control system including a second exit slit on the image surface along the axis of the first slit and a motor for driving the tipping plate on its turning axis in response to the phase of light incident on a photocell behind the second slit. Thus, if the index image is laterally offset from the longitudinal axis of the exit slits, so that more light of one phase than the other phase passes through the second exit slit, the tipping plate motor is energized to turn the tipping plate in the appropriate direction to return the index image toward the exit slit axis.

Two presently preferred embodiments of the invention are disclosed herein. In one embodiment, the optics of the instrument comprises a collimating lens and a separated objective lens located along the rotation axis, and the index image-positioning member comprises the index element from which the index image is derived. In this case, the index element itself rotates with the object to be aligned to produce rotation of the index image.

In the second illustrative embodiment of the invention, the optics are arranged to form an autocollimator. In this case, the index element is stationary and the image-positioning member comprises a Porro prism which rotates with the object to be aligned and reflects light rays from the index element to the image surface. Rotation of this Porro prism with the object rotates the index image through twice the angle of rotation of the object. This optical magnification of the index image rotation obviously enhances the accuracy and sensitivity of the instrument.

Both illustrative embodiments of the invention are provided with an eyepiece to permit visual observation of the index image on the image surface.

The invention will be better understood from the following detailed description thereof, taken in connection with the annexed drawings, wherein:

FIG. 1 is a diagrammatic illustration, in perspective, of the first presently preferred embodiment of the invention;

FIG. 2 is a view through the eyepiece of the instrument showing the index image in one position on the image surface;

FIG. 3 is a view through the eyepiece showing the index image in another position;

FIG. 4 is a view through the eyepiece showing the index image in yet another position; and FIG. 5 is a diagrammatic illustration, in perspective, of the second presently preferred embodiment of the invention.

In accordance with the preliminary discussion, FIG. 1 illustrates an object 10 to be angularly aligned on an axis of rotation 12 from a remote observation station 13 along the axis 12 and an optical projection means 14 for optically projecting along the axis of rotation 12 an index image 18 which is brought to sharp focus in an image plane 20 transverse to the rotation axis 12 at the observation station 13 and which image rotates in the image plane during and through an angle proportional to the angle of rotation of object 10 on its axis 12. Included in the projection means 14 is an index image-positioning member 22 which produces the aforesaid rotation of the index image 18 in the image plane 20. This image-positioning member comprises an optical prism having reflecting faces 24 and 26 which converge toward the image plane 20 and meet along an edge 28 intersecting the axis 12 at right angles. Edge 28 of prism 22 forms an index element which is imaged in the image plane 20 to form the index image 18. Stationarily mounted opposite the reflecting faces 24 and 26 of the prism 22 are lamps 30 and 32, respectively. These lamps are energized alternately from a suitable power source 33 so that the fluctuating light emitted by lamp 30 is out of phase with the fluctuating light emitted from lamp 32.

Optical projection means 14 includes further a collimating lens 34 and an objective lens 36 located on the rotation axis 12 between the prism 22 and the image plane 20. Light rays from lamp 30 are reflected from the prism face 24 along the rotation axis 12 through the collimating lens 34 and the objective lens 36 to the image plane 20. Similarly, light rays from lamp 32 are reflected from the prism face 26 through the collimating lens 34 and the objective lens 36 to the image plane 20. Collimating lens 34 collimates the light rays from the lamps 30 and 32 to produce a collimated light beam between the lenses 34 and 36. Objective lens 36 focuses these light rays to form an optical image (i.e., index image 18) of the index edge or element 28 in the image plane 20. From this description it is evident that prism 22 and its index element 28 rotate on axis 12 with the object 10 to be aligned and that this rotation of the index element 28 results in corresponding rotation of the index image 18 in the image plane 20. It is further evident that throughout a limited angle of rotation of prism 22, light rays from lamp 30 continue to be reflected from the prism face 24 and to arrive at the image plane 20 at one side of the index image 18 and light rays from lamp 32 continue to be reflected from the prism face 26 and to arrive at the image plane 20 at the opposite side of the index image 18. Accordingly, the index image 18 forms a line of demarcation or light separation image at the image plane 20 between the light rays of the one phase and the light rays of the other phase.

The angular position of the index image 18 in the index plane 20 is sensed electronically as follows: Disposed in the image plane 20 is a plate 38 with an opaque image-receiving surface 39 having a transparent exit slit 40. Directly behind this slit is a photocell 42. When the index image 18 is exactly centered on the slit 40, as shown in solid lines in FIG. 4, the image falls exactly along the longitudinal center line 41 of the slit, the amount of light of one phase passing through the slit at one side of the index image 18 being the same as the amount of light of the other phase passing through the slit at the opposite side of the index image. Under these conditions, then, the photocell 42 receives equal amounts of light of the two different phases. If the index image 18 is rotated to one side or the other side of its centered position on the slit 40, however, more light of one phase than the other phase passes through the slit 40 to the photocell 42. For example, if the index image 18 is rotated to its phantom line position of FIG. 4, only light of one phase from one of the lamps 30, 32 passes through the slit 40 to the photocell 42. When the index image 18 is rotated to the opposite side of its centered position on the slit 40, of course, photocell 42 receives more light of the other phase from the other lamp.

The output of the photocell 42 is coupled to a phase-responsive amplifier 44 which is supplied with a reference frequency from a reference frequency source 46. The output of the amplifier 44 is, in turn, coupled to a reversible servomotor 48, rigid on the shaft of which is a pinion 50 meshing with a gear 52 on a rotary part which turns on the axis 12 and carries the prism 22. Servomotor 48, thus, drives part 53, and, therefore, the prism 22, in rotation on the axis 12. Amplifier 44 with its reference frequency source 46 may comprise any conventional phase-responsive amplifier for energizing the servomotor 48 to drive part 53 in one direction of rotation in response to the photocell 42 receiving more light from lamp 30 than from lamp 32 and energizing the servomotor to drive part 53 in the opposite direction of rotation in response to the photocell 42 receiving more light from lamp 32 than from lamp 30. The amplifier 44 is polarized so that when the photocell 42 receives a preponderance of light of either phase, the servomotor 48 is energized to drive the rotary part 53 in the appropriate direction to rotate the index image 18 toward its centered position on the exit slit 40.

Since the collimating lens 34 forms the light rays from the lamps 30 and 32 into the collimated light beam 37, the objective lens 36 can be located at any desired distance along the axis 12 from the collimating lens. In actual practice, the objective lens 36, and the observation station 13 as a whole, may be located a relatively great distance from the collimating lens and the prism 22. It is evident, therefore, that when the instrument is initially set up, the rotation axis 12 may not, and generally will not, intersect the image plane 20 along the longitudinal axis 41 of the exit slit 40. Moreover, in actual practice, the prism edge or index element 28 may not exactly intersect the rotation axis 12, in which case the index image 18 rotates about an axis laterally displaced from the image itself. Because of one or both of these factors, the index image 18, when rotated into parallelism with the exit slit 40, may be laterally displaced from the slit. It is evident, therefore, that to attain accurate centering of the index image on the exit slit 40, not only must the index element be rotated into parallelism with the exit slit but, further, the image must be shifted laterally of the exit slit. To effect such lateral shifting of the index image, there is placed between the objective lens 36 and the image plane 20 an optical tipping plate 54. This tipping plate turns on an axis 56 transverse to the rotation axis 12 and parallel to the exit slit axis 41.

Tipping plate 54 is turned on its axis 56 by means of a reversible servomotor 58 which drives the tipping plate through a pinion 60 and a gear 62. Servomotor 58 is energized by a second phase-responsive amplifier 64 which is supplied with a reference frequency from a source 66. Coupled to the input of the amplifier 64 is a photocell 68 located behind a second exit slit 70 in the image surface 39. This exit slit 70 is centered on the longitudinal axis of the first exit slit 40 and both slits are located so that one end of the index image 18 falls on one slit and the other end of the image falls on the other slit. Turning of the tipping plate 54 on its axis 56, of course, shifts the index image 18 in the image plane 20 in a direction normal to the common longitudinal axis 41 of the exit slits 40 and 70. The phase-responsive amplifier 64 is so polarized that when the respective end of the index image 18 is displaced from its centered position on the exit slit 70, so that the photocell 68 receives more light from one lamp 30 or 32, than the other lamp, the servomotor 58 is energized by the amplifier 64 to turn the tipping plate 54 on its axis 56 in a direction to laterally shift the respective end of the index image toward the exit slit 70. It is evident, therefore, that the automatic control system, comprising the servomotor 58, phase-responsive amplifier 64 with its reference frequency source 66, and the photocell 68, operates to maintain the respective end of the index image 18 on the exit slit 70. Thus, the index image is rotated to a position wherein its other end is centered on the exit slit 40 by operation of the control system comprising the photocell 42, amplifier 44, and servomotor 48. These two control systems of the instrument, therefore, coact to maintain the index image 18 in its centered position on the exit slits 40 and 70 and, therefore, object 10 in a predetermined angular position on the axis 12. Any slight rotation of the object from this predetermined angular position is reflected in a corresponding rotation of the index image 18 from its centered position on the exit slit 40 and immediate response of the control system 42, 44, 46, 48 to return the rotary part to its predetermined angular position.

Included in the instrument is an eyepiece 72 and a system of prisms 74 which permit viewing of the index image 18 and the exit slits 40 and 70 so that the operation of the instrument can be visually observed. So far as visual observation through the eyepiece 72 is concerned, the exit slits 40 and 70 provide visual index means for cooperation with the index image 18.

Reference is now made to the instrument illustrated in FIG. 5. This modified instrument, like the first instrument, comprises a rotary part 100 which turns on an axis 102 and an optical projection means 104 for projecting an index image 106 along the axis 102 to an image plane 108 in which the index image 106 is sharply focused. Located on the rotation axis 102 is a beam splitter 110, opposite the partially reflecting surface 112 of which is a prism 114. The side reflecting faces 116 and 118 of this prism converge toward the beam splitter 110 and meet along an edge 120 located along in a transverse plane of an optic axis 121 intersecting the rotation axis 102 at the beam splitter surface 112 and optically aligned with the axis 102. As in the previous form of the invention, this prism edge defines an index element which is imaged in the image plane 108 to form the index image 106. Opposite the reflecting faces 116 and 118 of the prism 114 are two lamps 122 and 124, respectively. These lamps are alternately energized from a suitable source 125 so that the fluctuating light emitted by lamp 122 is 180° out of phase with the fluctuating light emitted by lamp 124.

Light rays from lamp 122 are reflected by prism face 116 to the partially reflecting surface 112 of the beam splitter 110 from whence they are reflected along the axis 102 toward the rotary part 100. Similarly, light rays from lamp 124 are reflected from the prism face 118 to the partially reflecting surface 112 of the beam splitter and are thence reflected along the axis 102 toward the rotary part 100. The light rays pass through a combined collimating and objective lens 126 located between the beam splitter 110 and the rotary part 100. This lens collimates the light rays reflected from the beam splitter to form a collimated light beam. Carried on the rotary part 100 is an index image-positioning member in the form of a Porro prism 130, the inner reflecting faces 132 and 134 of which are disposed at right angles to one another and at 45° angles to the axis 102 so as to provide a mirror pair for reflecting the collimated light beam back through the lens 126. The convergent light rays emerging from the lens 126 are partially transmitted through the beam splitter surface 112 to the image plane 108. The image plane 108 and the prism edge or index element 120 are located at the proper focal distances from the lens 126 so that an image of the index edge or element 120 is brought to sharp focus in the image plane 108 to form the index image 106. Light rays of one phase from lamp 122 arrive at the image plane 108 at one side of the index image 106 and light rays of the other phase from lamp 124 arrive at the image plane at the opposite side of the index image. The index image, therefore, forms a fine line of demarcation or light separation image at the image plane between the light rays of the two different phases.

Rotation of the Porro prism 130 on the axis 102 produces rotation of the index image 106 in the image plane 108 through an angle equal to twice the angle of rotation of the prism. The angular position of the index image in the image plane is, therefore, constantly related to the angular position of the prism 130 and the rotary part 100 on the rotation axis 102. The optical magnification of the angle of rotation of the index image just mentioned obviously enhances the accuracy and sensitivity of the instrument.

The angular position of the index image 106 in the image plane 108 is sensed in precisely the same way as in the previous form of the instrument. Thus, disposed in the image plane 108 is a plate 135 having an image-receiving surface 136 formed with two transparent exit slits 138 and 140 on a common longitudinal axis. These two exit slits are disposed to receive opposite ends of the index image 106. Behind the exit slit 138 is a photocell 142, the output of which is coupled to a phase-responsive amplifier 144 which is supplied with a reference frequency from a source 146. The output of the amplifier 144 is coupled to a reversible servomotor 148 which drives the rotary part 100 on its axis of rotation 102 through a pinion 150 on the servomotor shaft and a gear 152 on the rotary part 100. The amplifier 144 energizes servomotor 148 in response to the photocell 142 receiving more light of one phase from one of the lamps 122, 124 than light of the other phase from the other lamp, due to rotation of the index image 106 from its centered position on the exit slit 138, to rotate the rotary part 100 in the appropriate direction to return the index image 106 toward its centered position on the exit slit 138. Behind the exit slit 140 is a photocell 154, the output of which is coupled to a phase-responsive amplifier 156 which is supplied with a reference frequency from a source 158. The output of the amplifier 156 is coupled to a reversible servomotor 160 which drives an optical tipping plate 162, about a tipping axis 164, through gearing 166. The tipping axis 164 of the optical tipping plate 162 parallels the exit slits 138, 140, so that turning of the plate 162 on its axis 164 shifts the index image 106 in the transverse direction of the exit slits. The phase-responsive amplifier 156 energizes the servomotor 160 in response to the photocell 154 receiving more light of one phase than the other phase to turn the tipping plate 162 on its axis in the appropriate direction to return the index image 106 toward its centered position on the exit slit 140. Thus, the rotary part 100 of the instrument is accurately maintained in a predetermined angular position on its rotation axis 102 by the combined action of the control circuit comprising the photocell 142, amplifier 144, and servomotor 148 and the control circuit comprising the photocell 154, amplifier 156, and servomotor 160. The instrument has an eyepiece 168 and a system of prisms 170 for visual observation of the index image and exit slits.

It is obvious that each of the exit slit and photocell combinations illustrated here comprise a photoelectric receiver in which the exit slit forms the narrow photosensitive zone of the receiver. Other types of photoelectric receivers having narrow photosensitive zones may obviously be used in place of the illustrated exit slit and photocell arrangement.

Clearly, then, the invention herein described and illustrated is fully capable of attaining the objects and advantages preliminarily set forth.

While certain preferred embodiments of the invention have been disclosed for illustrative purposes, numerous modifications in the design, arrangement of parts, and instrumentalities of the invention are possible within the scope of the following claims.

What is claimed is:

1. An optical instrument comprising a rotary optical triangular prism, means for rotating said prism on an axis of rotation, said prism having one apex edge located along and in a transverse plane of said axis, two lamps opposite the faces of said prism at the two sides of said edge, said faces being inclined to said axis so as to reflect light rays from said lamps along said axis, a collimating lens on said axis for receiving and collimating said light rays to produce a collimated light beam, an objective lens located along said axis for receiving and converging the light rays of said beam to produce an optical image of said edge in an image plane transverse to said axis, a member having an image-receiving surface located along said axis in said plane to receive said image, an index means on said surface for cooperation with said index image, an optical tipping plate on said axis between the objective lens and said surface, and means for rotating said plate on an axis transverse to said rotation axis.

2. An optical instrument comprising an optical beam splitter having a partially reflective surface located along and inclined to an axis of rotation, a linear index element located along and in a transverse plane of an optic axis intersecting said rotation axis at said surface and optically aligned with said rotation axis, means for illuminating said element, said surface receiving and reflecting light rays from said element along said rotation axis, a combined collimating and objective lens positioned on said rotation axis to receive and collimate the reflected light rays to produce a collimated beam along said rotation axis, an optical reflector along said axis for receiving said beam and reflecting the latter along said rotation axis back through said lens, whereby the latter produces an optical image of said index element in an image plane transverse to said rotation axis, said reflector including image-positioning reflecting surfaces for said beam for effecting angular positioning of said image in said image plane in accordance with the angular position of said reflector on said rotation axis, a member having an image-receiving surface on said rotation axis in said image plane to receive said image, means for effecting relative rotation of said member and said reflector on said rotation axis, and an index means on said image surface for cooperation with said image.

3. An optical instrument comprising an optical beam splitter having a partially reflective surface located along and inclined to an axis of rotation, a linear index element located along and in a transverse plane of an optic axis intersecting said rotation axis at said surface and optically aligned with said rotation axis, means for illuminating said element, said surface receiving and reflecting light rays from said element along said rotation axis, a combined collimating and objective lens positioned on said rotation axis to receive and collimate the reflected light rays to produce a collimated beam along said rotation axis, an optical reflector along said axis for receiving said beam and reflecting the latter along said rotation axis back through said lens, whereby the latter produces an optical image of said index element in an image plane transverse to said rotation axis, said reflector including image-positioning reflecting surfaces for said beam for effecting angular positioning of said image in said image plane in accordance with the angular position of said reflector on said rotation axis, a member having an image-receiving surface on said rotation axis in said image plane to receive said image, means for effecting relative rotation of said member and said reflector on said rotation axis, an index means on said image surface for cooperation with said image, an optical tipping plate on said rotation axis between said beam splitter and image-receiving surface, and means for rotating said plate on an axis transverse to said rotation axis.

4. An optical instrument comprising a rotary optical Porro prism, means for rotating said prism on an axis of rotation, an optical beam splitter having a partially reflective surface located along and inclined to said axis, a second triangular optical prism having an apex edge located along and in a transverse plane of an optic axis intersecting said rotation axis at said surface and optically aligned with said rotation axis, two lamps opposite the faces of said prism at the sides of said edge, respectively, said faces being inclined to said optic axis to reflect light rays from said lamps along said optic axis to said partially reflective surface and the latter reflecting said rays along said rotation axis toward said Porro prism, a combination collimating and objective lens along said rotation axis between said beam splitter and Porro prism which receives and collimates the reflected light rays from said partially reflective surface to produce a collimated light beam along said rotation axis, said Porro prism reflecting said beam back along said rotation axis through said lens, whereby the latter produces an optical image of said edge in an image plane transverse to said rotation axis, a member having an image-receiving surface positioned along said rotation axis in said image plane to receive said image, a linear index means on said surface for cooperation with said image, an optical tipping plate along said rotation axis between said beam splitter and image-receiving surface, and means for rotating said plate on an axis parallel to said index means.

5. An optical instrument comprising an optical projection means including a pair of light sources, means for alternately energizing said sources, a linear index element between said sources, and means for projecting an optical image of said index and phased fluctuating light rays from said sources approximately along an axis of rotation and bringing said image to focus in an image plane transverse to said axis in such a way that light rays of one phase from one source arrive at said plane at one side of said image and light rays of another phase from the other source arrive at said plane at the opposite side of said image, said projection means including further an optical image-positioning member on said axis, the angular position of which member on said axis determines the angular position of said image in said plane, a photoelectric receiver having a narrow photosensitive zone in said plane, means for effecting relative rotation of said member and receiver on said axis to a position in which said image is centered on said zone, and means for sensing the phase of light incident on said zone.

6. An optical instrument comprising an optical projection means including a pair of light sources, means for alternately energizing said sources, a linear index element between said sources, and means for projecting an optical image of said index and phased fluctuating light rays from said sources approximately along an axis of rotation and bringing said image to focus in an image plane transverse to said axis in such a way that light rays of one phase from one source arrive at said plane at one side of said image and light rays of another phase from the other source arrive at said plane at the opposite side of said image, said projection means including further an optical image-positioning member on said axis, the angular position of which member on said axis determines the angular position of said image in said plane, a photoelectric receiver having a narrow photosensitive zone in said plane, means for rotating said member on said axis to a position in which said image parallels said zone, an optical tipping plate on said axis before said plane, means for rotating said plate on an axis approximately parallel to said zone to translate said image in said image plane in a transverse direction of said zone, whereby said image may be centered on said zone, and means for sensing the phase of light incident on said zone.

7. An optical instrument comprising an optical projection means including a pair of light sources, means for alternately energizing said sources, a linear index element between said sources, and means for projecting an optical image of said index and phased fluctuating light rays from said sources approximately along an axis of rotation and bringing said image to focus in an image plane transverse to said axis in such a way that light rays of one phase from one source arrive at said plane at one side of said image and light rays of another phase from the other source arrive at said plane at the opposite side of said image, said projection means including further an opical image-positioning member on said axis, the angular position of which member on said axis determines the angular position of said image in said plane, a first photoelectric receiver having a first narrow photosensitive zone in said plane, a second photoelectric receiver having a second narrow photosensitive zone in said plane and collinear with said first zone, means for effecting relative rotation of said member and said receivers on said axis to a position in which said image parallels said zones, an optical tipping plate on said axis before said plane, means for rotating said plate on an axis approximately parallel to said zones to translate said image in a transverse direction on said zones, whereby said image may be centered on said zones, first means for sensing the phase of light incident on one zone, and second means for sensing the phase of light incident on the other zone.

8. An optical instrument comprising an optical projection means including a pair of light sources, means for alternately energizing said sources, a linear index element between said sources, and means for projecting an optical image of said index and phased fluctuating light rays from said sources approximately along an axis of rotation and bringing said image to focus in an image plane transverse to said axis in such a way that light rays of one phase from one source arrive at said plane at one side of said image and light rays of another phase from the other source arrive at said plane at the opposite side of said image, said projection means including further an optical image-positioning member on said axis, the angular position of which member on said axis determines the angular position of said image in said plane, a photoelectric receiver having a narrow photosensitive zone in said plane, means for sensing the phase of light incident on said zone, and means including a reversible motor controlled by said phase-sensing means for effecting relative rotation of said member and receiver in one direction on said rotation axis in response to said zone receiving a preponderance of light of one phase and in the opposite direction in response to said zone receiving a preponderance of light of the other phase.

9. An optical instrument comprising an optical projection means including a pair of light sources, means for alternately energizing said sources, a linear index element between said sources, and means for projecting an optical image of said index and phased fluctuating light rays from said sources approximately along an axis of rotation and bringing said image to focus in an image plane transverse to said axis in such a way that light rays of one phase from one source arrive at said plane at one side of said image and light rays of another phase from the other source arrive at said plane at the opposite side of said image, said projection means including further an optical image-positioning member on said axis, the angular position of which member on said axis determines the angular position of said image in said plane, a first photoelectric receiver having a first narrow photosensitive zone in said plane, a second photoelectric receiver having a second narrow photosensitive zone in said plane and collinear with said first zone, an optical tipping plate on said axis before said plane arranged with its tipping axis approximately parallel to said zones to translate said image in a transverse direction on said zones, whereby said image may be centered on said zones, first means for sensing the phase of light incident on one zone, second means for sensing the phase of light on the other zone, means including a first reversible motor controlled by said first phase-sensing means for effecting relative rotation of said member and receivers in one direction on said rotation axis in response to said one zone receiving a preponderance of light of one phase and in the opposite direction in response to said one zone receiving a preponderance of light of the other phase, and means including a second reversible motor controlled by said second phase-sensing means for turning said tipping plate in one direction on its tipping axis in response to the other zone receiving a preponderance of light of one phase and in the opposite direction in response to said other zone receiving a preponderance of light of the other phase.

10. An optical instrument comprising optical means located on an axis of rotation and including a linear index element along and in a transverse plane of said axis, two lamps situated at opposite sides of said index, means for alternately energizing said lamps, a collimating lens on said axis, and light transmission means for transmitting fluctuating light rays of one phase from one lamp along said axis to said lens from one side of said element and fluctuating light rays of another phase from the other lamp along said axis to said lens from the other side of said element, said lens collimating said light rays to produce a collimated light beam approximately on said axis, an objective lens located along said axis from said collimating lens for receiving said beam and converging the light rays of the beam to produce an optical image of said element in an image plane transverse to said axis, light rays of said one phase arriving at said image plane at one side of said image and light rays of said other phase arriving at said image plane at the other side of said image, a first photoelectric receiver having a first narrow photosensitive zone in said image plane, a second photoelectric receiver having a second narrow photosensitive zone in said image plane and collinear with said first zone, an optical tipping plate on said axis between said objective lens and image plane arranged with its tipping axis approximately parallel to said zones to translate said image in a transverse direction of said zones, whereby said image may be centered on said zones, a first means for sensing the phase of light incident on one zone, a second means for sensing the phase of light on the other zone, means including a first reversible motor controlled by said first phase-sensing means for effecting relative rotation of said optical means and receivers in one direction on said rotation axis in response to said one zone receiving a preponderance of light of one phase and in the opposite direction in response to said one zone receiving a preponderance of light of the other phase, and means including a second reversible motor controlled by said second phase-sensing means for turning said tipping plate in one direction on its turning axis in response to the other zone receiving a preponderance of light of one phase and in the opposite direction in response to said other zone receiving a preponderance of light of the other phase.

11. An optical instrument comprising a rotary triangular optical prism which turns on an axis of rotation and has an apex edge located along and in a transverse plane of said axis, two alternately energized lamps opposite the faces of said prism at the sides of said edge, respectively, a collimating lens on said axis, one of said faces being inclined to said axis to reflect fluctuating light rays of one phase from one lamp along said axis to said lens and the other face being inclined to said axis to reflect fluctuating light rays of another phase along said axis to said lens, said lens collimating said light rays to produce a collimated light beam approximately on said axis, an objective lens located along said axis from said collimating lens for receiving said beam and converging the light rays of the beam to produce an optical image of said element in an image plane transverse to said axis, light rays of said one phase arriving at said image plane at one side of said image and light rays of said other phase arriving at said image plane at the other side of said image, a first photoelectric receiver having a first narrow photosensitive zone in said image plane, a second photoelectric receiver having a second narrow photosensitive zone in said image plane and collinear with said first zone, said optical means and zones being relatively rotatable on said axis to a position in which said image parallels said zones, an optical tipping plate on said axis between said objective lens and image plane which turns on an axis approximately parallel to said zones to translate said image in a transverse direction of said zones, whereby said image may be centered on said zones, a first means for sensing the phase of light incident on one zone, a second means for sensing the phase of light incident on the other zone, means including a first reversible motor controlled by said first phase-sensing means for rotating said prism in one direction on said rotation axis in response to said one zone receiving a preponderance of light of one phase and in the opposite direction in response to said one zone receiving a preponderance of light of the other phase, and means including a second reversible motor controlled by said second phase-sensing means for turning said tipping plate in one direction on its turning axis in response to the other zone receiving a preponderance of light of one phase and in the opposite direction in response to said other zone receiving a preponderance of light of the other phase.

12. An optical instrument comprising an optical beam splitter having a partially reflective surface located on and inclined to an axis of rotation, a linear index element located along and in a transverse plane of an optic axis intersecting said rotation axis at said surface and optically aligned with said rotation axis, two alternately energized lamps, light transmission means for transmitting fluctuating light rays of one phase from one lamp along said optic axis to said surface from one side of said element and fluctuating light rays of another phase from the other lamp along said optic axis to said surface from the other side of said element, a combined collimating and objective lens positioned on said rotation axis for receiving and collimating light rays after they are reflected from said surface to produce a collimated light beam approximately along said rotation axis, an optical reflector on said rotation axis for reflecting said beam back through said lens, whereby the latter produces an optical image of said element in an image plane transverse to said rotation axis, light rays of said one phase arriving at said image plane at one side of said image and light rays of said other phase arriving at said image plane at the other side of said image, a first photoelectric receiver having a first narrow photosensitive zone in said image plane, a second photoelectric receiver having a second narrow photosensitive zone in said image plane and collinear with said first zone, said optical reflector and zones being relatively rotatable on said axis to a position in which said image parallels said zones, an optical tipping plate on said axis between said lens and image plane which turns on an axis approximately parallel to said zones to translate said image in a transverse direction of said zones, whereby said image may be centered on said zones, a first means for sensing the phase of light incident on one zone, a second means for sensing the phase of light on the other zone, means including a first reversible motor controlled by said first phase-sensing means for effecting relative rotation of said optical reflector and zones in one direction on said rotation axis in response to said one zone receiving a preponderance of light of one phase and in the opposite direction in response to said one zone receiving a preponderance of light of the other phase, and means including a second reversible motor controlled by said second phase-sensing means for turning said tipping plate in one direction on its turning axis in response to the other zone receiving a preponderance of light of one phase and in the opposite direction in response to said other zone receiving a preponderance of light of the other phase.

13. An optical instrument comprising an optical beam splitter having a partially reflective surface located on and inclined to an axis of rotation, a triangular optical prism having an apex edge located along and in a transverse plane of an optic axis intersecting said rotation axis at said surface and optically aligned with said rotation axis, two alternately energized lamps opposite the faces of said prism at the sides of each edge, respectively, one prism face being inclined to said optic axis to reflect fluctuating light rays of one phase from one lamp along said optic axis to said partially reflective surface from one side of said edge and the other prism face being inclined to said optic axis to reflect fluctuating light rays of another phase from the other lamp along said axis to said reflective surface from the other side of said edge, a combined collimating and objective lens positioned on said rotation axis for receiving and collimating said light rays after they are reflected from said surface to produce a collimated light beam approximately along said rotation axis, an optical Porro prism rotatable on said rotation axis for reflecting said beam back through said lens, whereby the latter produces an optical image of said edge in an image plane transverse to said rotation axis, light rays of said one phase arriving at said image plane at one side of said image and light rays of said other phase arriving at said image plane at the other side of said image, a first photoelectric receiver having a first narrow photosensitive zone in said image plane, a second photoelectric receiver having a second narrow photosensitive zone in said image plane and collinear with said first zone, said Porro prism being rotatable on said rotation axis to a position in which said image parallels said zones, an optical tipping plate on said rotation axis between said lens and image plane which turns on an axis approximately parallel to said zones to translate said image in a transverse direction of said zones, whereby said image may be centered on said zones, a first means for sensing the phase of light on one of said zones, a second means for sensing the phase of light on the other zone, means including a first reversible motor for rotating said Porro prism in one direction in response to said one zone receiving a preponderance of light of said one phase and in the opposite direction in response to said one zone receiving a preponderance of light of the other phase, and means including a second reversible motor for turning said tipping plate in one direction on its turning axis in response to said other zone receiving a preponderance of light of said one phase and in the opposite direction in response to said other zone receiving a preponderance of light of the other phase.

References Cited in the file of this patent

UNITED STATES PATENTS

| | | |
|---|---|---|
| 2,375,665 | Koulicovitch | May 8, 1945 |
| 2,901,941 | Brumley | Sept. 1, 1959 |
| 2,958,783 | Taylor | Nov. 1, 1960 |
| 2,968,735 | Kaufold et al. | Jan. 17, 1961 |
| 2,992,334 | Kaestner et al. | July 11, 1961 |
| 2,998,746 | Gievers | Sept. 5, 1961 |

---

UNITED STATES PATENT OFFICE
CERTIFICATE OF CORRECTION

Patent No. 3,114,842                  December 17, 1963

Donald E. Davidson

It is hereby certified that error appears in the above numbered patent requiring correction and that the said Letters Patent should read as corrected below.

In the grant, line 2, and in the heading to the printed specification, line 5, address of assignee, for "Covina", each occurrence, read -- West Covina --.

Signed and sealed this 19th day of January 1965.

(SEAL)
Attest:

ERNEST W. SWIDER                              EDWARD J. BRENNER
Attesting Officer                                   Commissioner of Patents

UNITED STATES PATENT OFFICE
CERTIFICATE OF CORRECTION

Patent No. 3,114,842　　　　　　　　　　　　　　December 17, 1963

Donald E. Davidson

It is hereby certified that error appears in the above numbered patent requiring correction and that the said Letters Patent should read as corrected below.

In the grant, line 2, and in the heading to the printed specification, line 5, address of assignee, for "Covina", each occurrence, read -- West Covina --.

Signed and sealed this 19th day of January 1965.

(SEAL)
Attest:

ERNEST W. SWIDER　　　　　　　　　　　　　　EDWARD J. BRENNER
Attesting Officer　　　　　　　　　　　　　　Commissioner of Patents